३,०६१,४५३
PROCESS FOR INCORPORATING PHOTOGRAPHIC REAGENTS IN A PHOTOGRAPHIC ELEMENT USING A COMMON SOLVENT AND A PREFERENTIAL SOLVENT
Howard G. Rogers, Auburndale, Mass., assignor to Polaroid Corporation, Cambridge, Mass., a corporation of Delaware
No Drawing. Filed Aug. 3, 1959, Ser. No. 831,016
9 Claims. (Cl. 117—34)

The present invention is concerned with coating processes and, more particularly, with coating processes for use in the photographic art.

One object of this invention is to provide processes for minutely dispersing materials in polymeric films.

Another object of this invention is to provide processes for dispersing water-insoluble, organic-soluble materials in aqueous polymeric coating solutions.

Still another object is to provide processes for dispersing organic-insoluble, water-soluble materials in organic polymeric coating solutions.

Other objects of the invention will in part be obvious and will in part appear hereinafter.

The invention accordingly comprises the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description.

Frequently in the coating art it is desirable to molecularly disperse materials in polymeric films. When the materials to be dispersed and the polymeric film-forming materials are mutually soluble in a solvent, no problem arises. The materials to be dispersed and the polymeric film-forming materials may be dissolved in a common solvent and coated therefrom. However, sometimes the solvents, in which the materials are mutually soluble, cannot be used in the actual coating operation for reasons such, for example, as low flash point, toxicity, slow drying rates, etc., and it is necessary to use as a solvent a material which is a nonsolvent for the material to be dispersed. In such instances, the fineness of the dispersion is usually limited by the fineness to which the dispersed phase is ground. The grinding operations are time consuming and usually require costly, heavy equipment. Often the fineness of the dispersion leaves much to be desired. The present invention is concerned with providing processes for minutely dispersing such materials in polymeric films and eliminating the time consuming and costly grinding operations. It is believed that the processes of the present invention have an additional advantage of providing dispersions of a more uniform particle size.

It has been found that dispersions possessing properties approaching those of molecular dispersions may be prepared by dissolving the materials to be dispersed and the polymeric film-forming material in a common solvent, separating the solute from the solvent, preferably by evaporation, and redissolving the resulting film in a solvent for the polymeric film-forming material.

A preferred embodiment of the present invention relates to processes for dispersing water-insoluble, organic-soluble materials in aqueous coating solutions comprising an organic-soluble, water-soluble film-forming material. This embodiment is carried out by dissolving the material to be dispersed and the polymeric film-forming material in an organic solvent. The organic solvent is then evaporated off and the resulting film is redissolved in water. The coating solution produced may be applied directly to the stratum which is to be coated or it may be further modified, e.g., added to other aqueous coating solutions.

The processes for disposing organic-soluble, water-soluble materials in aqueous polymeric coating solutions have been found to be widely applicable in the photographic art in the preparation of laminated photographic elements, e.g., photosensitive elements, image-receiving elements, etc. In this art it is usually desirable to coat from aqueous coating solutions and frequently many of the reagents, which are added to the coating solutions, are organic soluble but not water soluble. Examples of such reagents are dyes and color couplers used in color photography which are usually disposed in the photo-emulsion layers or in layers adjacent to such emulsion layers. As examples of other reagents, mention may be made of low mobility developers, antifoggants, filters, ultraviolet light absorbers, etc. It is usually desirable when such reagents are disposed in the photosensitive element that they be present in a finely divided state so that they may readily perform their designated functions. The processes of this invention provide processes for so disposing such reagents.

The processes herein disclosed are especially useful for preparing photosensitive elements for use in color diffusion transfer processes. In a preferred mode of carrying out such processes the color-providing substances, which are used, are disposed in the photosensitive elements and, more particularly, in the photoemulsion layers or in alkali-permeable layers adjacent and preferably behind the emulsions with which they are associated. Generally, the color-providing substances, although they may be soluble in aqueous alkali, are insoluble in water. As a result of this, in preparing the photosensitive elements, the color-providing substances have to be dispersed in aqueous coating solutions or coated from organic solutions. When the color-providing substances are coated from organic coating solutions, they become molecularly dispersed in the resulting film and thus provide a large surface area for the photographic reactions in which they partake. However, when they are dispersed in aqueous coating solutions, the surface area of the dispersed particles in the resulting film often leaves much to be desired, and images of low density are obtained. The present invention provides methods for obtaining dense transfer images while using aqueous coating solutions to prepare the photosensitive elements.

As examples of such color diffusion transfer processes, mention may be made of the processes disclosed and claimed in the copending U.S. application of Howard G. Rogers, Serial No. 748,421, now Patent No. 2,983,606, filed July 14, 1958, as a continuation-in-part of U.S. application Serial No. 415,073, filed March 9, 1954 (now abandoned), wherein dye developers (i.e., compounds which contain in the same molecule both the chromophoric system of a dye and also a silver halide developing function) are the color-providing substances, the processes disclosed and claimed in U.S. Patent No. 2,647,049, issued July 28, 1953, to Edwin H. Land, wherein color developers are employed to develop the latent image and color couplers are the color-providing substances, and the processes disclosed in U.S. Patent No. 2,774,668, issued December 18, 1956, to Howard G. Rogers, wherein complete, preformed dyes are used as the color-providing substances.

The processes herein disclosed have been found particularly useful for disposing dye developers in photosensitive elements. Dye developers, as noted above, are compounds which contain in the same molecule both the chromophoric system of a dye and also a silver halide developing function. By "a silver halide developing function" is meant a radical which is capable of developing an exposed silver halide image. Particularly useful dye developers are those in which the silver halide developing function is provided by the presence of a benzenoid developing radical. A preferred benzenoid developing radical in such compounds is a hydroquinonyl radical. Examples of representative dye developers are given in the previously mentioned U.S. application Serial No. 748,421, now Patent No. 2,983,606. Additional useful dye developers are described in the following copending U.S. applications:

Application Serial No. 449,514, filed August 12, 1954, in the names of Elkan R. Blout and Myron S. Simon, and now abandoned.

Application Serial No. 471,542, filed November 26, 1954, in the names of Elkan R. Blout, Saul G. Cohen, Milton Green, Howard G. Rogers, Myron S. Simon and Robert B. Woodward, and now abandoned.

Application Serial No. 612,045, filed September 25, 1956, in the names of Elkan R. Blout, Milton Green and Howard G. Rogers, and now abandoned.

Application Serial No. 612,052, filed September 25, 1956, in the names of Milton Green and Howard G. Rogers.

Application Serial No. 612,053, filed September 25, 1956, in the name of Myron S. Simon.

Application Serial No. 612,054, filed September 25, 1956, in the names of Helen P. Husek and Myron S. Simon.

Application Serial No. 612,055, filed September 25, 1956, in the name of Helen P. Husek.

Application Serial No. 755,804, filed August 18, 1958, in the names of Elkan R. Blout, Saul G. Cohen, Milton Green and Myron S. Simon.

Application Serial No. 824,786, filed July 3, 1959, in the names of Elkan R. Blout, Marilyn R. Cohler, Milton Green, Myron S. Simon and Robert B. Woodward.

When the processes of this invention are used in the preparation of photosensitive elements, image-receiving elements, etc., the steps are carried out as heretofore described, i.e., the organic-soluble, water-insoluble reagents and the water-soluble, organic-soluble polymer are dissolved in an organic solvent in which they are mutually soluble; the solvent is evaporated off, and the resulting film is taken up in water. The resulting solution may then be applied in the sequence desired to a stratum of the element which is to be prepared.

When the organic-soluble, water-insoluble materials are to be disposed in a layer comprising, at least in part, a water-soluble, organic-insoluble polymer, e.g., in a gelatino silver halide emulsion layer, the coating solution is prepared, as described above, and then added to the coating solution comprising the water-soluble, organic-insoluble polymer. It should be understood in such an embodiment that the water-soluble, organic-soluble, film-forming polymer should be compatible with the water-soluble organic-insoluble, film-forming polymer. As an example of this embodiment, an organic-soluble, water-insoluble coupler can be dispersed in a gelatin silver halide emulsion by dissolving the coupler and an organic-soluble, water-soluble polymeric film-forming material in an organic solvent, evaporating off the organic solvent, dissolving the resulting film in water, and adding the coating solution, thus prepared, to an aqueous gelatino silver halide emulsion. The aqueous gelatino silver halide emulsion coating solutions may be prepared by the various methods which are available. When desired, one may replace gelatin, which is the carrier usually used in the silver halide emulsion layers, in whole or in part with gelatin substitutes such, for example, as cellulose ethers, polyvinyl alcohols, partially hydrolyzed organic acid esters of polyvinyl alcohols, acetals of polyvinyl alcohols, etc.

The steps of the processes herein disclosed may be carried out by commonly known methods. Conventional mixing apparatus may be used in the initial and subsequent solubilization steps, and drum, tray, spray, vacuum, etc., drying techniques may be employed in the evaporation step. It will be understood that, where necessary, the pH of the various solutions may be varied to increase solubility, facilitate solubilization, etc. When desired, dispersing agents may be added to the coating solvent to further prevent agglomeration. When employing such agents, it is preferable to add them to the coating solvent before it is used to dissolve the precast film. As examples of such dispersing agents, mention may be made of Daxad 11 (trade name of Dewey & Almy Chemical Co., Cambridge, Massachusetts, for a formaldehyde condensation product of naphthalene sulfonic acid), and Tamol 731 (trade name of Rohm & Haas Chemical Co., Philadelphia, Pennsylvania, for a polyelectrolyte type dispersing agent).

The following nonlimiting examples illustrate the processes within the scope of this invention:

*Example 1*

0.4 gm. of 1-phenyl-3-N-n-hexyl-carboxamido-4-[p-($\beta$-hydroquinonylethyl)-phenylazo]-5-pyrazolone (a yellow dye developer prepared by processes similar to those disclosed in the previously mentioned copending application Serial No. 612,045) was dissolved in 4 cc. of tetrahydrofuran and mixed with 15 cc. of a methanol solution comprising 4% of an o-sulfobenzal of polyvinyl alcohol (sodium salt). The resulting solution was coated on a gelatin-coated base. After drying, the coating was rewet with 15 cc. of water, scraped from the base and solubilized, using gentle heating. The resulting solution was added to 11 cc. of a blue-sensitive gelatino silver halide emulsion and coated on a gelatin-subcoated cellulose acetate support.

*Example 2*

0.5 gm. of 2-[p-(2',5'-dihydroxyphenethyl)-phenylazo]-4-propoxy-1-naphthol (a magenta dye developer, prepared by processes similar to those disclosed in the previously mentioned copending application Serial No. 612,045) was dissolved in 1 cc. of acetone, mixed with 15 cc. of a 4% methanol solution of an o-sulfobenzal of polyvinyl alcohol (sodium salt) and coated on a gelatin-coated base. After drying, the coating was rewet with 15 cc. of water, scraped from the base and solubilized, using gentle heating. The resulting solution was added to 11 cc. of a green-sensitive gelatino silver halide emulsion and coated on a gelatin-subcoated cellulose acetate support.

*Example 3*

4 cc. of an acetone solution comprising 3% of 2-[p-(2',5'-dihydroxyphenethyl)-phenylazo]-4-methoxy-1-naphthol was added to 30 cc. of an aqueous solution comprising 4% of gelatin and a small amount of a nonionic emulsifying and dispersing agent and coated on a gelatin-coated base. After drying, the coating was taken up in water and added to a green-sensitive gelatino silver halide emulsion and coated on a gelatin-subcoated cellulose acetate support.

When the photosensitive elements, prepared in the above examples, were exposed and processed in a manner similar to that disclosed in the previously mentioned copending application Serial No. 748,421, dense transfer images of the photographed subject were obtained.

In the above examples a combination of solvents was used in the initial solubilization step. It should be understood that the term "solvent," as used herein, refers to solvents comprising a single member, e.g., methyl alcohol, as well as to solvents comprising a plurality of members, e.g., mixtures of methyl alcohol and acetone, etc.

The term "laminated photographic elements," as used herein, is intended to cover image-receiving elements as well as photosensitive elements. In general, such image-receiving elements at least comprise a sheet of an image-receiving material, e.g., baryta paper. In a preferred embodiment, they comprise a support which has been coated with an image-receiving stratum. Often it is desirable to incorporate some of the photographic reagents in one or more layers of the image-receiving element. The processes herein disclosed may be used to prepare such image-receiving elements.

The present invention is equally useful in dispersing water-soluble, organic-insoluble materials in organic coating solutions comprising an organic-soluble, water-soluble polymeric film-forming material. Such dispersions may be made by dissolving the material to be dispersed and the polymeric film-forming material in water, evaporating off the water, and dissolving the resulting film in a solvent for the film-forming material. This embodiment should be especially useful when the faster drying rates of some organic solvents are desired.

In the embodiment wherein an organic-soluble, water-insoluble material is dispersed in an aqueous coating solution and in the embodiment wherein a water-soluble, organic-insoluble material is dispersed in an organic coating solution, it should be noted that it is necessary that the polymeric film-forming material be both water-soluble and organic-soluble. As examples of such water-soluble, organic-soluble, film-forming materials, mention may be made of: sulfobenzals of polyvinyl alcohol (sodium salt), alkali metal, ammonia, aliphatic amine and hydroxyaliphatic amine salts of cellulose acetate hydrogen phthalate; poly-N-methylmethacrylamide, copolymers of dimethylaminoethyl methacrylate and acrylic acid; terpolymers of dimethylaminoethyl methacrylate, acrylic acid and butyl acrylate; copolymers of N,N-diethylacrylamide and acrylamide, mixed sulfobenzal and carboxybenzal of polyvinyl alcohol (sodium salt); poly-N-methyl acrylamide; poly-N-ethyl acrylamide; copolymers of N-methyl acrylamide and N-hydroxymethyl acrylamide; copolymers of N-methylacrylamide and methyl acrylate; poly-N,N-diethylacrylamide; copolymers of N-vinylpyrrolidone and N,N-diethylacrylamide; copolymers of N-vinylpyrrolidone and acrylic acid; copolymers of N,N-diethylacrylamide and acrylamide; copolymers of dimethylaminoethyl methacrylate and methacrylic acid; copolymers of methyl vinyl ketone and acrylamide; terpolymers of dimethylaminoethyl methacrylate, methyl acrylate and methacrylic acid; terpolymers of dimethylaminoethyl methacrylate, N-benzylacrylamide and methacrylic acid; copolymers of N,N-dimethylacrylamide and methacrolein; and copolymers of N-vinylpyrrolidone and methacrolein. It should be understood that when the above copolymers are comprised of hydrophobic and hydrophilic segments, the water-soluble polymers will generally have a mole fraction of hydrophilic segments of at least 0.5.

The processes of this invention are further useful in an all-organic system, i.e., a system wherein both the material to be dispersed and the polymeric film-forming material are organic soluble, but not water soluble. The necessity of using this process may arise when, as pointed out above, a common solvent cannot be used in the actual coating operations for reasons such as low flash point, toxicity, slow drying rates, etc. In such an embodiment, the material to be dispersed and the polymeric film-forming material are dissolved in a common organic solvent, the common solvent is evaporated off and the resulting film is dissolved in an organic solvent for the polymeric film-forming material.

In a further embodiment of this invention, minute dispersions are prepared by dissolving the material to be dispersed and a dispersing agent in a common solvent, evaporating off the solvent, and dispersing the resulting solid in the coating solution which is to be prepared. The coating solution may, as will be understood, comprise other dispersed materials, film-forming materials, etc.

Although the processes herein disclosed consistently produce fine dispersions, one may vary the particle size of the dispersed phase within certain limits by the specific selection of the solvents, the film-forming polymers, etc.

It should be noted that the processes herein disclosed are in no way restricted to the specific embodiments set forth. The solubility characteristics of chemical compounds and polymeric film-forming materials are well known or readily determinable by simple solubility tests, and little difficulty should be encountered in applying the processes herein set forth to specific coating operations.

Since certain changes may be made in the above process without departing from the scope of the invention herein involved, it is intended that all matter contained in the above description shall be interpreted as illustrative and not in a limiting sense.

What is claimed is:

1. A process for incorporating organic-soluble, water-insoluble photographic reagents in laminated photographic elements from aqueous coating solutions, said process comprising dissolving said reagents and at least one organic-soluble, water-soluble polymeric film-forming material in a common organic solvent, evaporating off the organic solvent, dissolving the resulting film in water, and coating the resulting solution on a stratum of the laminated photographic element which is to be formed.

2. A process as defined in claim 1, wherein said resulting solution is added to an aqueous solution comprising a water-soluble, organic-insoluble polymeric film-forming material prior to being applied to said stratum.

3. A process as defined in claim 1, wherein said resulting solution is added to an aqueous silver halide emulsion prior to being applied to said stratum.

4. A process as defined in claim 3, wherein said silver halide emulsion is a gelatino silver halide emulsion.

5. A process as defined in claim 1, wherein said laminated photographic element is a photosensitive element.

6. A process as defined in claim 1, wherein said laminated photographic element is an image-receiving element.

7. A process as defined in claim 1, wherein said organic-soluble, water-insoluble photographic reagent is a dye developer.

8. A process as defined in claim 1, wherein said organic-soluble, water-insoluble photographic reagent is a color coupler.

9. A process as defined in claim 1, wherein said organic-soluble, water-insoluble photographic reagent is a dye.

References Cited in the file of this patent

UNITED STATES PATENTS

| | | |
|---|---|---|
| 2,066,850 | Nadeau | Jan. 5, 1937 |
| 2,334,096 | Howald et al. | Nov. 9, 1943 |
| 2,574,243 | Collins et al. | Nov. 6, 1951 |
| 2,725,305 | Allen et al. | Nov. 29, 1955 |
| 2,857,274 | Land et al. | Oct. 21, 1958 |
| 2,874,045 | Land | Feb. 17, 1959 |